(12) United States Patent
Vook et al.

(10) Patent No.: US 11,686,814 B2
(45) Date of Patent: Jun. 27, 2023

(54) FREQUENCY MODULATED CONTINUOUS WAVE (FMCW) RADAR TARGET EMULATION WITH SYNCHRONIZED MODULATION REFLECTION DEVICES

(71) Applicant: Keysight Technologies, Inc., Santa Rosa, CA (US)

(72) Inventors: Dieter W. Vook, Santa Clara, CA (US); Todd Steven Marshall, Los Gatos, CA (US); Jefferson B. Burch, Palo Alto, CA (US); Gregory S. Lee, Mountain View, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 274 days.

(21) Appl. No.: 17/113,465

(22) Filed: Dec. 7, 2020

(65) Prior Publication Data
US 2022/0179043 A1   Jun. 9, 2022

(51) Int. Cl.
*G01S 7/40* (2006.01)
*G01S 13/931* (2020.01)
*G01S 13/00* (2006.01)

(52) U.S. Cl.
CPC .......... *G01S 7/4056* (2013.01); *G01S 13/931* (2013.01); *G01S 7/4095* (2021.05)

(58) Field of Classification Search
CPC ......... G01S 7/4052; G01S 13/103; G01S 9/40
See application file for complete search history.

(56) References Cited

U.S. PATENT DOCUMENTS

| | | | | |
|---|---|---|---|---|
| 3,792,475 A | * | 2/1974 | Smetana | G01S 7/4052 342/168 |
| 3,903,521 A | * | 9/1975 | Jensen | G01S 7/40 342/171 |
| 4,070,769 A | * | 1/1978 | Hollis | G09B 9/40 434/2 |
| 4,168,582 A | * | 9/1979 | Heidrich | G01S 7/4052 377/54 |
| 5,160,264 A | * | 11/1992 | Banura | G01S 7/4056 342/171 |
| 5,223,840 A | * | 6/1993 | Cronyn | G01S 7/4052 342/170 |

(Continued)

OTHER PUBLICATIONS

"FMCW_Start_of_Chrip_Detection", Keysight invention disclosure 20200188, Dieter Vook, et. al, Jul. 2020, 17 pgs.
(Continued)

*Primary Examiner* — Bernarr E Gregory

(57) ABSTRACT

An apparatus is for generating an emulated radar reflection signal of a target. The apparatus includes a radar detector configured to detect a radar signal frame emitted by a device under test (DUT), an emulation transmitter configured to generate an emulated radar reflection signal of a target being emulated, and a processor configured to generate control signals which control the emulation transmitter according to at least one characteristic of the target being emulated. The processor is further configured to determine a current radar parameter among plural possible radar parameters of the radar signal frame of the DUT, and to adapt the control signals which control the emulation transmitter according to the determined current radar parameter of the radar signal frame of the DUT.

20 Claims, 11 Drawing Sheets

(56) References Cited

U.S. PATENT DOCUMENTS

| | | | |
|---|---|---|---|
| 5,457,463 A * | 10/1995 | Vencel | G01S 7/4052 |
| | | | 342/170 |
| 6,114,985 A | 9/2000 | Russell et al. | |
| 9,971,028 B2 | 5/2018 | Park | |
| 2006/0267832 A1 * | 11/2006 | Newberg | G01S 7/4052 |
| | | | 342/195 |
| 2010/0017174 A1 * | 1/2010 | Lyon | G01S 13/103 |
| | | | 703/2 |

OTHER PUBLICATIONS

"Multi-target radar emulator system", Gregory S. Lee, US patent application, filed May 6, 2020, Keysight docket 20190101, 27 pgs.

Werner Scheiblhofer et al, "A Low-Cost Multi-Target Simulator for FMCW Radar System Calibration and Testing", Proceedings of the 14th European Radar Conference, Oct. 11-13, 2017, Nuremberg, Germany, pp. 343-346.

Ziqiang Tong et al, "Fast chirp FMCW radar in automotive applications," IET International Radar Conference 2015, Hangzhou, 2015, pp. 1-4.

Robert Bosch GmbH, Bosch FR5CPCCF radar report: https://fccid.io/NF3-FR5CPCCF/Test-Report/Test-Report-4401623; showing Bosch Radar frequency chart, Jul. 10, 2019, pp. 1-46.

Pseudo Noise coding of micro timing of chirps of Continental radar. Documented on p. 26 of "Short Description ARS 404-12 (Entry) + 408 (Premium) Long Range Radar Sensor 77GHz), technical data, version 1.08 en", ARS 408-21 datasheet—Drafted on: Oct. 31, 2015, ROL—Version: 07—Amended on: Jul. 7, 2017 ROL, 2 pgs.

* cited by examiner

FREQUENCY MODULATED CONTINUOUS WAVE (FMCW) RADAR TARGET EMULATION WITH SYNCHRONIZED MODULATION REFLECTION DEVICES

BACKGROUND

Modern cars increasingly incorporate so-called Advanced Driver Assistance Systems (ADAS). Among these, already well established are Emergency Brake Assist (EBA) and Lane Assist (LA) systems, with the goal being fully autonomous vehicles. All these systems require sensors to allow an electronic (or engine) control unit (ECU) of the vehicle to gather sufficient information indicative of the surrounding environment. Examples of commonly used and/or proposed ADAS sensors include ultrasonic sensors, video cameras, radar sensors and lidar (or LiDAR) sensors. Among these, radar is generally conceded to have clear advantages in fog and perhaps other adverse environmental conditions.

One major challenge when developing ADAS equipped vehicles is to verify proper operations in the myriad of different scenarios which might occur in real traffic. To carry out this verification in real life is not a suitable possibility. First, it is hard to achieve the required coverage (i.e. to actually test all relevant scenarios) as this would require too much time (millions of hours). Second, some of the most stringent real life tests are unethical because they are dangerous by their very nature. Adding to these test barriers is the fact that all sensors must be verified in concert as it is important to verify that the ECU makes the right decision based on the data it is gathering from all sensors.

Consequently, auto manufacturers and even the sensor module vendors themselves are eager to electronically emulate driving conditions on a virtual platform. In the case of radar, it is desirable that the test system of the virtual platform be synchronized with the radar of the device under test (DUT) to consistently emulate the same targets during all phases of the radar.

SUMMARY

According to an aspect of the inventive concepts, an apparatus for generating an emulated radar reflection signal of a target is provided. The apparatus includes a radar detector configured to detect a radar signal frame emitted by a device under test (DUT), an emulation transmitter configured to generate an emulated radar reflection signal of a target being emulated, and a processor configured to generate control signals which control the emulation transmitter according to at least one characteristic of the target being emulated. The processor is further configured to determine a current radar parameter among plural possible radar parameters of the radar signal frame of the DUT, and to adapt the control signals which control the emulation transmitter according to the determined current radar parameter of the radar signal frame of the DUT.

According to another aspect of the inventive concepts, a system for testing a vehicular radar is provided that includes a controller and a target emulator. The controller includes a memory that stores instructions, and a processor that executes the instructions. The controller is configured to execute a three-dimensional (3D) scenario simulation configured to generate drive scenarios including targets in a surrounding environment of the vehicular radar. The target emulator is configured to transmit an emulated radar reflection signal to the vehicular radar corresponding to the drive scenarios generated by the 3D scenario simulation. The target emulator includes a radar detector configured to detect a radar signal frame emitted by the vehicular radar, and an emulation transmitter configured to generate the emulated radar reflection signal of a target being emulated. The processor is further configured to generate control signals which control the emulation transmitter according to at least one characteristic of the target being emulated, to determine a current radar parameter among plural possible radar parameters of the radar signal frame of the vehicular radar, and to adapt the control signals which control the emulation transmitter according to the determined current radar parameter of the radar signal frame of the vehicular radar.

According to still another aspect of the inventive concepts, a computer readable medium is provided that stores instructions that cause a signal processor of a system for testing a vehicular radar to carry out a processor-implemented method of generating an emulated radar reflection signal of a target. The processor-implemented method receiving a signal corresponding to a radar signal frame emitted by the vehicular radar, driving an emulation transmitter to generate an emulated radar reflection signal of a target being emulated, and controlling the emulation transmitter according to at least one characteristic of the target being emulated. The processor-implemented method further includes determining a current radar parameter among plural possible radar parameters of the radar signal frame of the vehicular radar, and adapting control signals which control the emulation transmitter according to the determined current radar parameter of the radar signal frame of the vehicular radar. The plural possible radar parameters include at least one of an instantaneous frequency and an instantaneous power.

BRIEF DESCRIPTION OF THE DRAWINGS

The above and other aspects and features of the inventive concepts will become readily apparent from the detailed description that follows with reference to the accompany drawings, in which.

DETAILED DESCRIPTION

In commonly assigned U.S. Pat. No. 11,543,489, entitled "Multi-Target Radar Emulator System", the entire disclosure of which is incorporated herein by reference herein, techniques are described for achieving target emulation in radars such as FMCW (frequency-modulated continuous-wave) radars. FMCW radars constitute nearly 100% of the current automotive radar market. Some modern radars use "Fast Chirp FMCW". In some cases, the fast FMCW chirps are not uniformly spaced in time, and instead their start times are dithered to improve features like isolation from other oncoming vehicles that may have their own radars. These radars extract relative velocity by measuring the phase change (slip) from chirp to chirp of the returned signal.

Figure 1:
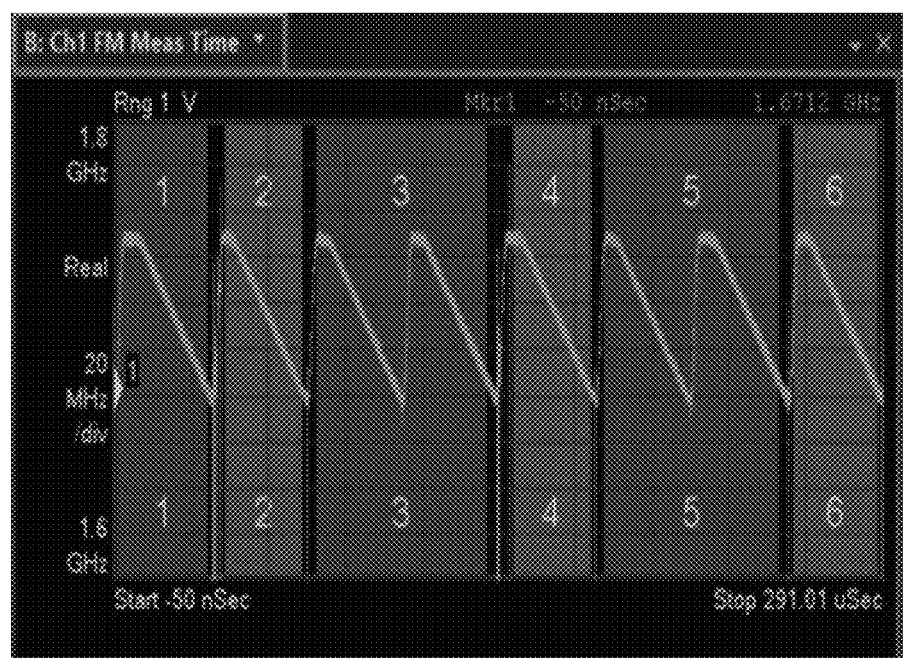
FIG. 1 is a diagram showing extracted frequency of chirps from a Continental® automotive radar.
Figure 2:
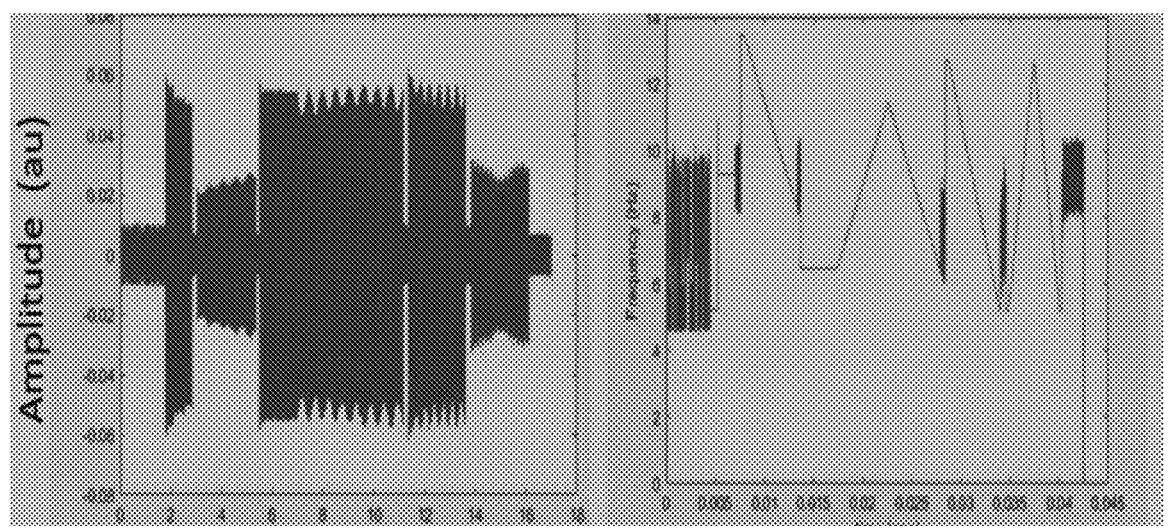
FIG. 2 is a diagram showing amplitude and frequency time profiles of a radar frame of a commercial automotive radar.

FIG. 1 shows the extracted frequency of chirps from a Continental® automotive radar, and FIG. 2 shows the amplitude (left side) and frequency (right side) time profiles of the radar frame of a commercial automotive radar. It can be seen that chirp start times are not consistent and instead are dithered slightly (36 μsec+/−up to 2 μsec). The chirp slopes are the same for a burst (Long Range Radar LRR) but will be different for the next burst (e.g. as in Medium Range Radar MRR). If one uses a constant frequency offset to emulate a target, the relative velocity measured by the radar is jumbled by the phase change implied by the randomized start times. The phase of the signal used to create the frequency offset should be set to the value corresponding to the desired velocity from chirp to chirp at the start of each chirp so to provide a consistent relative velocity. This chirp to chirp phase shift is constant for zero velocity, while nonzero velocities result in a phase shift from chirp to chirp consistent with the velocity. This is just one example of how modern automotive radars have variations of the FMCW signals that would cause the radar to perceive incorrect results if a constant frequency offset is used to emulate targets. Each radar frame may have multiple sections in which the radar operates in a different manner. This may be reflected in different FMCW chirp slopes, different antennas (Long range vs. Medium range, for example), and so on. Embodiments described herein track the radar of the device under test (DUT) and adapt the emulation control signals to the radar's present output. In this manner the test system is synchronized with the radar to consistently emulate the same targets during all the phases of the radar of the device under test (DUT).

Figure 3:
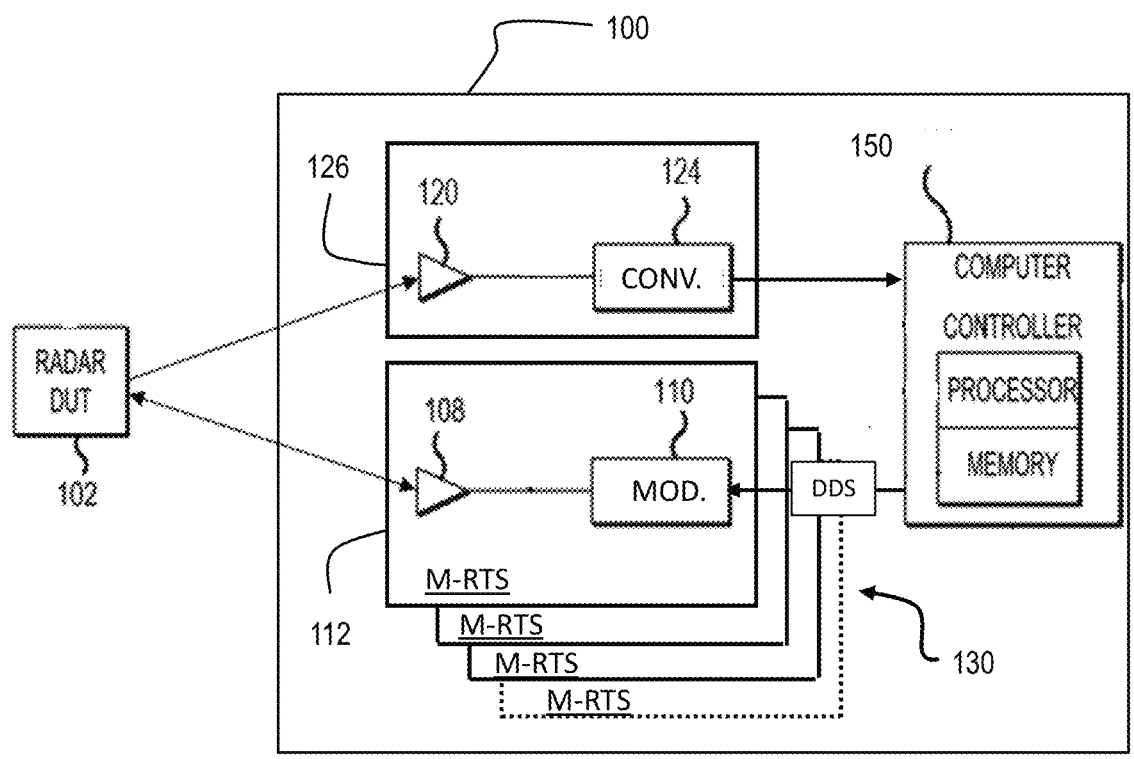
FIG. 3 is a circuit block diagram illustrating an apparatus for generating an emulated radar reflection signal of a target in accordance with an embodiment of the inventive concepts.

FIG. 3 illustrates an embodiment of an apparatus 100 for generating an emulated radar reflection signal of a target in accordance with the inventive concepts. The emulated radar reflection signal may be for use in testing a radar 102 (including its associated detection circuits/software) of a device under test (DUT). The radar 102 may be a vehicular radar, and as will be appreciated by one of ordinary skill in the art having the benefit of the present disclosure, one likely vehicular radar is an automobile radar that is used in various capacities in current and emerging automobile applications. The embodiments of the inventive concepts are not limited by the type of vehicle.

Referring to FIG. 3, the apparatus 100 includes a radar antenna 108 and a modulation circuit 110. The radar antenna 108 and the modulation circuit 110 together constitute an emulation transmitter 112 that is configured to generate an emulated radar reflection signal of a target being emulated. In some embodiments of the inventive concepts, a single emulation transmitter 112 emulating a single target is provided, while in other embodiments multiple emulation transmitters 112 emulating multiple targets are provided. Separately, in some embodiments, each emulation transmitter 112 is described as a miniature radar target simulator (M-RTS). The term "miniature" is a relative term that is particularly applicable in the case where an array 130 of M-RTSs 112 is provided each representing a "radar pixel". Radar target simulators conventionally operate with a small number of antennas that are either placed at fixed locations or can be mechanically moved. In contrast, a relatively large number of M-RTSs 112 may be provided with each having a relatively small antenna 108. This arrangement allows for the placement and movement of objects virtually at any location and with any speed in front of the radar 102 of the DUT without the need for mechanical movements. Additionally, objects are not limited to point objects since multiple "radar pixels" can be combined to emulate the spatial extension of an object. However, it is noted that the embodiments described herein are not limited by the dimensions of the emulation transmitter(s) 122, i.e., by the dimensions of the antenna 108 and/or modulation circuit 110.

The apparatus 100 of FIG. 3 further includes an antenna 120 and a conversion circuit 124. The antenna 102 and conversion circuit 124 together constitute an example of a radar detector 126 configured to detect a radar signal frame emitted by the radar 102 of the DUT. The antenna 120 receives a radar signal from the radar 102 of the DUT. The conversion circuit 124 processes the corresponding output of the antenna 120 to generate a digitized signal indicative of the radar signal or a characteristic (such as power) of the radar signal. This digitized signal is supplied to a computer 150 described next. It is noted that one or more characteristics of the radar of the DUT can be determined in an analog domain by the conversion circuit 124 and/or in the digital domain by the computer 150.

Still referring to FIG. 3, the apparatus 100 includes a computer 150 operatively coupled to the radar detector 126 and the emulation transmitter(s) 112. The computer 150 at least in part functions as a controller of the apparatus 100 and includes a processor. The processor may, for example, be a microprocessor and/or a field programmable gate array. As will be explained by way of examples later herein, the processor controls the emulation transmitter(s) 112 responsive in part to the digitized signal indicative of the radar signal received from the radar detector 126. The controller may also include, or have access to, a memory that stores instructions which are executed by the processor. The processor and memory may be distributed and networked together, or integrated with the computer 150. Likewise, all or part of the radar detector 126 may be integrated with one or more components of the computer 150, and all or part of the emulation transmitter(s) 112 may be integrated with one or more components of the computer 150.

In one operational example, the signal from the radar 102 is captured with a horn antenna 120 and mixed down to baseband using an RF mixer of the conversion circuit 124, where it is then low pass filtered and digitized. The digital signal is processed with algorithms known in the art, to determine the instantaneous frequency. If the radar frame has been characterized ahead of time, the control of the M-RTS 112 can be performed based on the calculated instantaneous frequency to yield the desired targets and target velocities. M-RTS 112 control circuit may be a direct digital control system DDS as illustrated in FIG. 3. It will be understood that the DDS may be integrated with the computer 150.

Figure 4A:
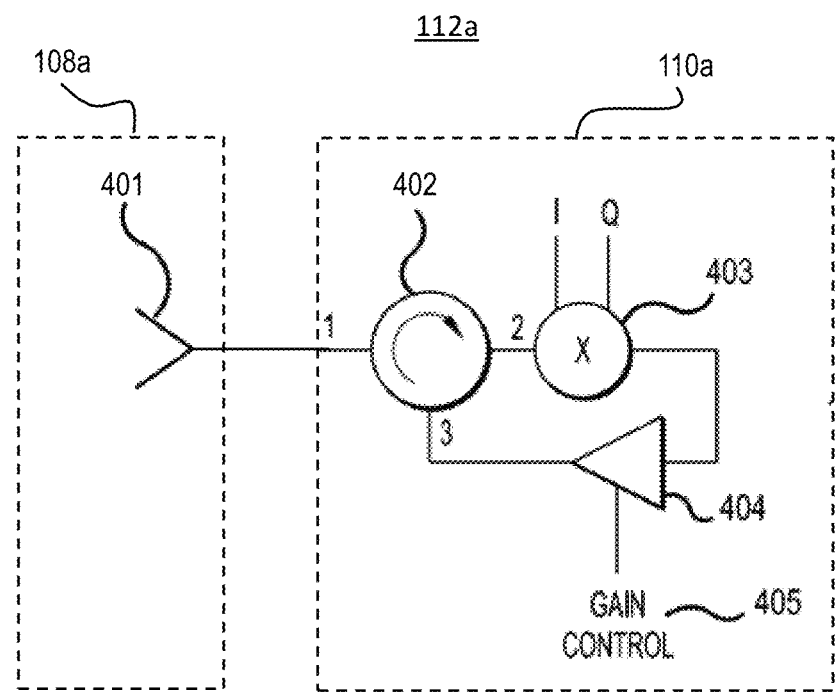
FIG. 4A is a circuit block diagram illustrating an example of an emulation transmitter of the apparatus of FIG. 3 according to an embodiment of the inventive concepts.

FIG. 4A is a circuit block diagram illustrating an example of an emulation transmitter 112a of the apparatus 100 of FIG. 3 according to an embodiment of the inventive concepts.

Referring to FIG. 4A, the antenna 108a of the emulation transmitter 112a is implemented by a re-illumination antenna 401, and the modulation circuit 110a of the emulation transmitter 112a includes a circulator 402, mixer 403 and a variable gain amplifier (VGA) 404.

The re-illumination antenna 401 may be a horn antenna selected for the wavelength of signals received from the radar of the DUT (not shown in FIG. 4). The re-illumination antenna 401 may have a variable gain and may be coupled to a beam-shaping element, such as a lens to tailor a degree of freedom of an apparent angle of arrival (AoA) of transmitted electromagnetic waves. The use of a horn or similar antenna for re-illumination antenna 401 is not essential, and other types of antennae, such as patch antennae or patch antennae arrays (described below), are contemplated.

The circulator 402 operates such that a signal received from the antenna 401 at port 1 is applied to the mixer 403 at port 2, and a signal received from the VGA 404 at port 3 is applied to the antenna 401 at port 1. In this manner, an emulated reflection signal is transmitted by the re-illumination antenna 401 to the radar of the DUT.

The mixer 403 of the illustrated example of FIG. 4A is an in-phase (I)-quadrature (Q) mixer (IQ mixer), which may be a single-sideband IQ mixer, with standard 90° phasing of the RF signal, resulting in an output of either the upper sideband (USB) or the lower sideband (LSB), while rejecting the LSB or USB, respectively.

The output of the mixer 403 is provided to the VGA 404, which includes a gain control input 405. The gain control input 405 of the VGA 404 is operatively connected to the computer 150 of the apparatus 100 of FIG. 3. The VGA 404, under control of the computer 150, enables proper emulation of the re-illuminated signal emitted by the antenna 401.

For additional operational details of the emulation transmitter 112a, attention is directed to FIG. 4 and the corresponding discussion appearing in the previously mentioned U.S. patent application Ser. No. 16/867,804.

Figure 4B:
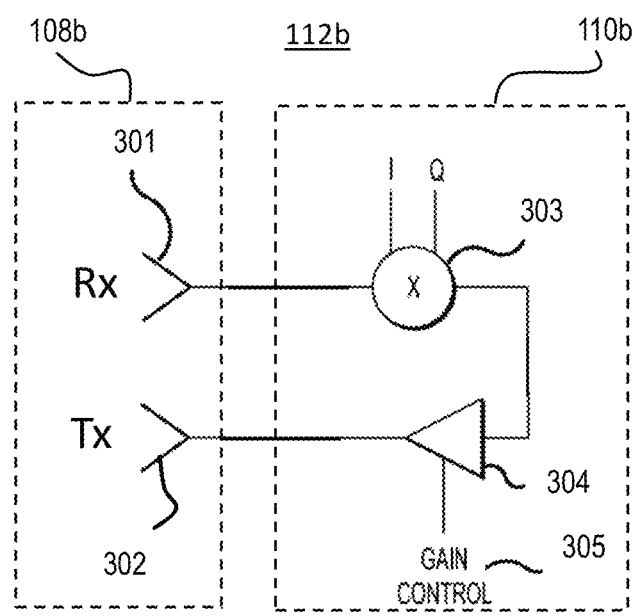
FIG. 4B is a circuit block diagram illustrating an example of an emulation transmitter of the apparatus of FIG. 3 according to another embodiment of the inventive concepts.

FIG. 4B is a circuit diagram illustrating another example of an emulation transmitter 112b of the apparatus 100 of FIG. 3 according to an embodiment of the inventive concepts.

The embodiment of FIG. 4B is similar to that of FIG. 4A in that the modulation circuit 110b includes a mixer 303 (like the mixer 403 of FIG. 4A) and a VGA 304 (like the VGA 404 of FIG. 4A). Also, a gain control 305 of the VGA 304 is controlled by the computer 150 of FIG. 3 in the same or similar manner as in FIG. 4A. On the other hand, the embodiment of FIG. 4B differs from that of FIG. 4A in that the circulator 402 of FIG. 4A is omitted, and the antenna 108b is configured with separate reception (Rx) and transmission (Tx) antennas 301 and 302. As shown, the reception antenna 301 feeds the mixer 303, and the output of the VGA 304 is applied to the transmission antenna 302 such that an emulated reflection signal is transmitted by the transmission antenna 401 to the radar of the DUT. Otherwise, the figuration of FIG. 4B operates in the same manner as the configuration of FIG. 4A.

Figure 5A:
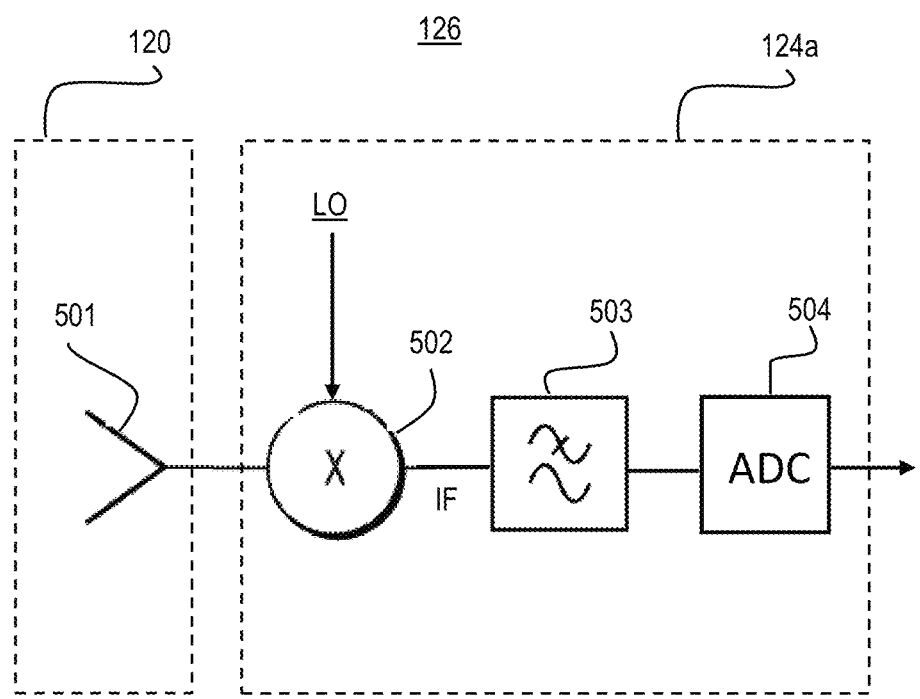
FIG. 5A is a circuit block diagram illustrating an example of a radar detector of the apparatus of FIG. 3 according to an embodiment of the inventive concepts.

FIG. 5A is a circuit diagram illustrating an example of a radar detector 126a of the apparatus 100 of FIG. 3 according to an embodiment of the inventive concepts. Like the radar detector 126 of FIG. 3, the radar detector 126a of FIG. 4A includes an antenna 120a and a conversion circuit 124a.

Referring to FIG. 5A, the antenna 120a of the radar detector 112a may be a reception (Rx) antenna 501, such as a horn antenna. The reception (Rx) antenna 501 receives each radar frame emitted by the radar 102 of the DUT.

The conversion circuit 124a is configured to convert an output of the antenna 501, or a characteristic of the output of the antenna 501, into a format suitable for processing by the computer 150 of the apparatus 100 of FIG. 3. In the example of FIG. 5A, the conversion circuit 124a includes a mixer 502, a low-pass filter 503 and an analog-to-digital converter (ADC) 504. The mixer 502 is supplied with a local oscillator LO to frequency down-convert an output of the antenna 501 to an intermediate frequency IF. As an example, the intermediate frequency IF may be a baseband frequency on the order of 1 to 2 GHz. Also as an example, a frequency of the local oscillator LO may be around 75 GHz. It will be understood that the embodiment is not limited by these numerically defined examples.

The down-converted signal of the intermediate frequency IF is passed through the low-pass filter 503 to remove high frequency components, and then digitized by the ADC 504. The digitized output of the ADC 504 is supplied to the computer 150 of FIG. 3.

Figure 5B:
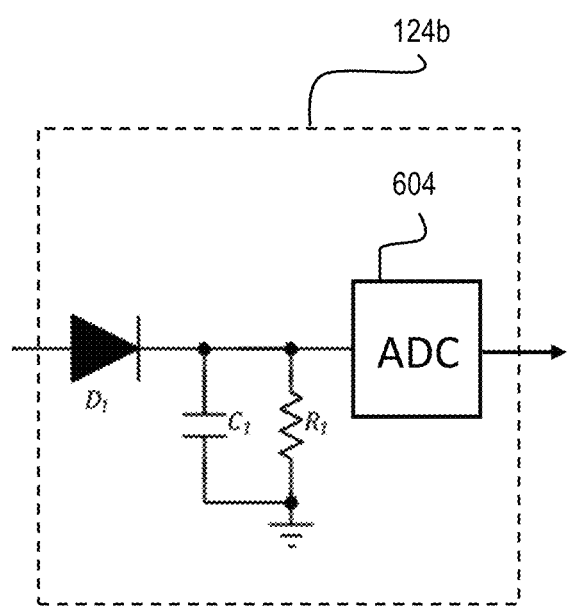
FIG. 5B is a circuit block diagram illustrating another example of a radar detector of the apparatus of FIG. 3 according to an embodiment of the inventive concepts.

In the example of FIG. 5A, one or more characteristics of the radar 102 of the DUT may be determined in the digital domain by the computer 150. FIG. 5B is a circuit diagram illustrating an example of a conversion circuit 124b in which one or more characteristics (in this case power) of the radar 102 is determined in the analog domain.

Referring to FIG. 5B, the conversion circuit 124b includes a diode D1 having an input that receives an output of the antenna 120 (FIG. 3), and an output coupled to a grounded parallel circuit of a capacitive element C1 and a resistive element R1. These components form an RF diode detector in which a voltage across R1 corresponds to the power of the RF signal received at the input of the diode D1.

The output voltage of the RF diode detector (i.e., the voltage across R1 indicative of a power of the radar of the DUT) is digitized by an ADC 604, and the digitized output of the ADC 504 is supplied to the computer 150 of FIG. 3.

It is noted here that the inventive concepts are not limited by the examples of the radar detectors described above in connection with FIGS. 5A and 5B. Rather, the inventive concepts encompass other circuits that may be contemplated by those in the art for monitoring parameters (or frame characteristics) of the radar of the DUT. Further, in the embodiments described above, as shown in FIG. 3, a separate antenna 120 is provided for the purpose of detecting the radar of the DUT. However, the inventive concepts are not limited in this manner. For example, FIGS. 6A and 6B illustrate embodiments in which an antenna of an emulation transmitter 112 is used to capture the radar of the DUT.

Figure 6A:
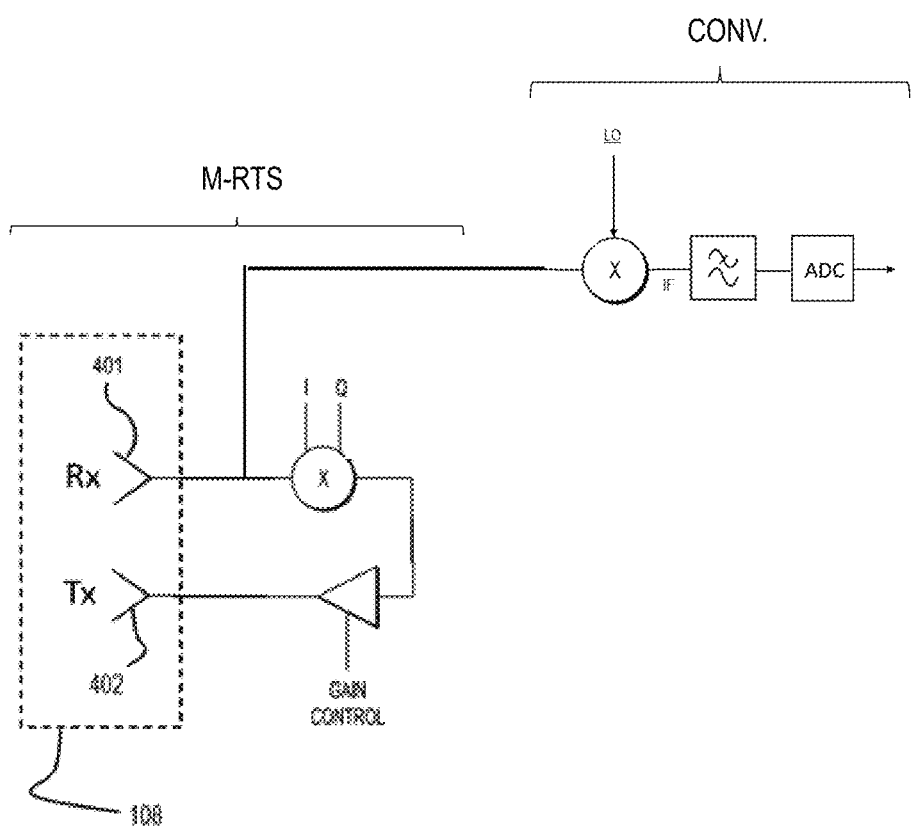
FIGS. 6A and 6B are circuit block diagrams in which an antenna of an emulation transmitter is used in the detection of radar by the radar detector according to embodiments of the inventive concepts.
Figure 6B:
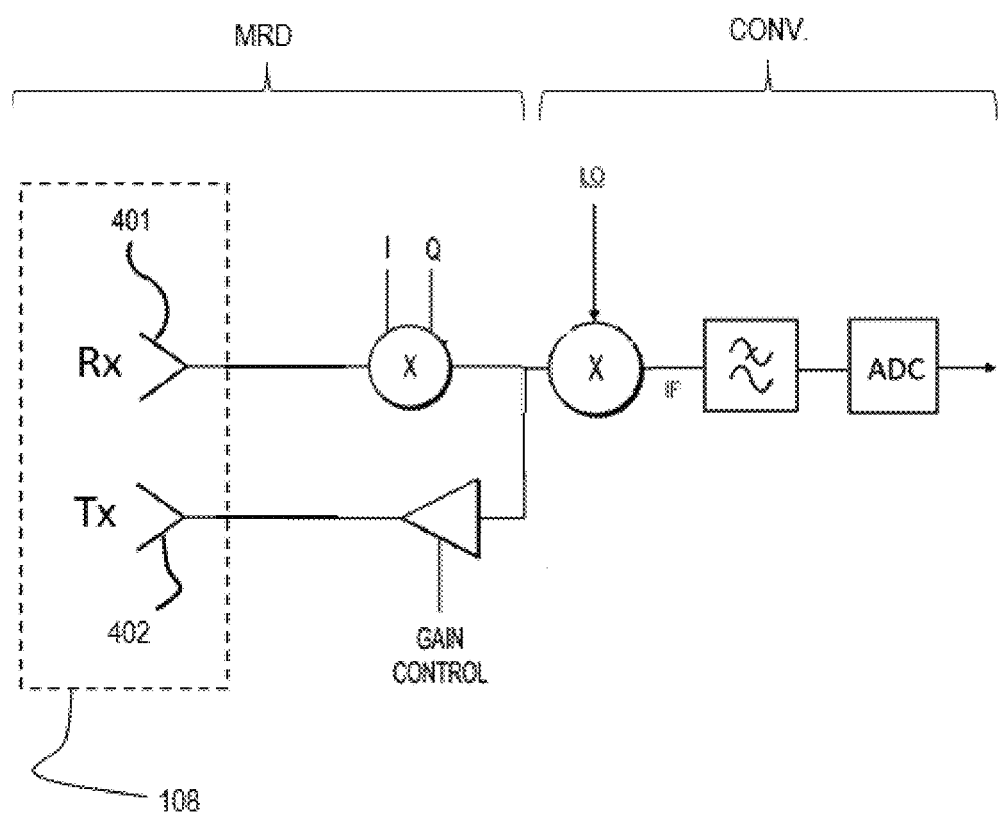

That is, in the example of FIG. 6A, the RF signal applied to a conversion circuit CONV (for example, the conversion circuit 124a of FIG. 5A) is obtained from the output of reception Rx antenna 401 of the emulation transmitter (or M-RTS). In the example of FIG. 6B, the RF signal applied to a conversion circuit CONV (for example, the conversion circuit 124a of FIG. 5A) is obtained from the output of reception Rx antenna 401 of the emulation transmitter (or M-RTS).

Regardless of which of the afore-described configurations is adopted, embodiments of inventive concepts include controlling the M-RTSs for general target emulation to emulate target's parameters (velocity, range etc.), particularly in the case where the radar is changing modes (frequency slope, FMCW vs. "Fast FMCW", vs. up-down chirp, etc.). The radar is monitored over the air in order to characterize radar frame features (Frame timing, FMCW frequency slopes, chirp start and stop frequencies etc.). The M-RTS control signals are then changed to emulate consistent targets during the different parts of the radar RF Frame.

Figure 7:
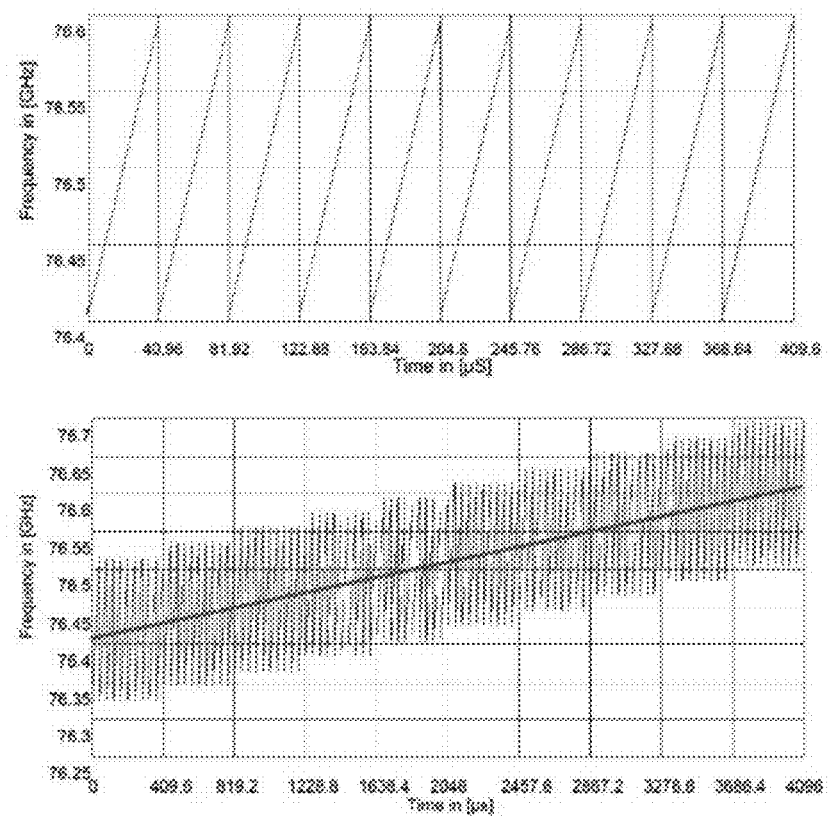
FIG. 7 is a diagram FIG. 7 showing the frequency over time in the case of the Bosch® FRCPCCF automotive radar.

As an example of where thresholds and parameters may be adapted to progressively changing radar frames, attention is now directed to FIG. 7 showing the frequency over time in the case of the Bosch® FRCPCCF automotive radar. The top of the figure shows 1 sequence of 10 ramps with 229 MHz deviation and 409.6 μs duration, while the bottom of the figure shows a progression of multiple sequences. It can be seen that the FMCW chirp frequency changes over time. This radar also randomizes the start of chirp, as does the Continental® automotive radar, as well as changes the start and stop frequencies of the chirps over the frame time. According to embodiments of the inventive concepts, the frequency parameters (such as instantaneous frequency and/or instantaneous power) of the fast chirp FMCW waveform can be monitored over time, and the threshold frequencies can be adjusted accordingly. Alternatively, or in addition, the control signals can be adapted to reset each M-RTS to synchronize to the radar signal frame in response to detection of at least one of a detected instantaneous power and a detected instantaneous frequency of the radar signal frame. The detection of frame characteristics over time and the adaption of the MRD control parameters to provide a consistent target to the radar.

The inventive concepts include system for testing a vehicular radar is provided that includes a controller and a target emulator. The controller includes a memory that stores instructions, and a processor that executes the instructions. The controller is configured to execute a three-dimensional (3D) scenario simulation configured to generate drive scenarios including targets in a surrounding environment of the vehicular radar. The target emulator is configured to transmit an emulated radar reflection signal to the vehicular radar corresponding to the drive scenarios generated by the 3D scenario simulation. The target emulator includes a radar detector configured to detect a radar signal frame emitted by the vehicular radar, and an emulation transmitter configured to generate the emulated radar reflection signal of a target being emulated. The processor is further configured to generate control signals which control the emulation transmitter according to at least one characteristic of the target being emulated, to determine a current radar parameter among plural possible radar parameters of the radar signal frame of the vehicular radar, and to adapt the control signals which control the emulation transmitter according to the determined current radar parameter of the radar signal frame of the vehicular radar. An example of such a system for testing a vehicular radar is described next in connection with FIG. 8.

Figure 8:
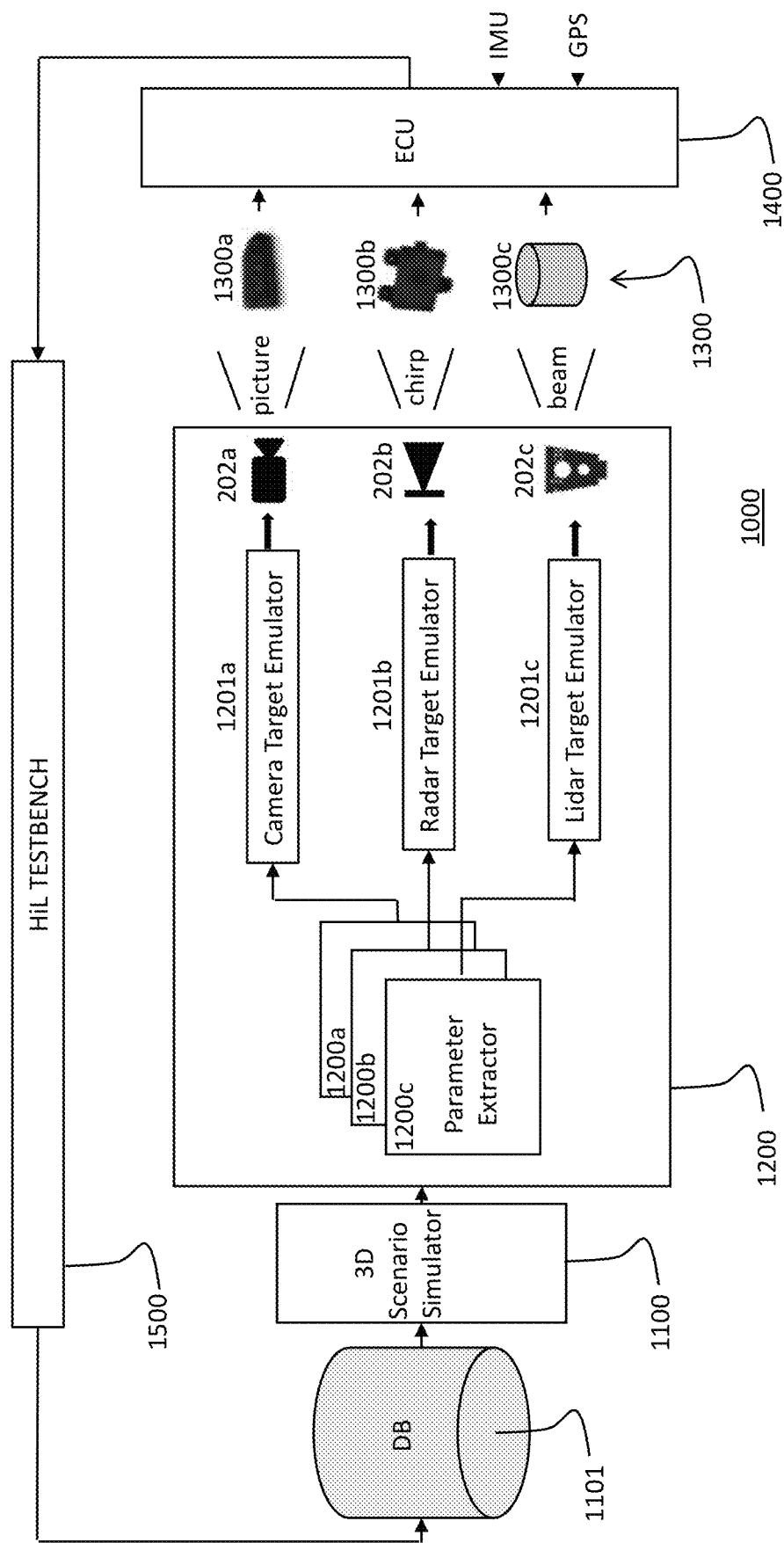
FIG. 8 is a high-level block diagram showing the architecture of an autonomous driving emulation (ADE) platform 1000 according to an embodiment of the inventive concepts.

FIG. 8 is a high-level block diagram showing the architecture of an autonomous driving emulation (ADE) platform 1000 according to an embodiment of the inventive concepts.

Referring to FIG. 8, the ADE platform 1000 includes a 3D scenario simulator 1100, a scenario emulator 1200, sensors 1300, an electronic control unit (ECU) 1400, and a Hardware-In-Loop (HiL) testbench 1500.

While the embodiments herein are primarily focused on radar, the sensors 1300 of the example of FIG. 8 optionally include a camera sensor 1300a and a lidar sensor 1300c in addition to a radar sensor 1300b. Each sensor 1300 is configured to sense a surrounding environment of a vehicle equipped with ADAS functionality.

The ECU 1400 is a dedicated module of a vehicle that is responsible for the ADAS functions of the vehicle. In order to assess a surrounding environment, the ECU 1400 fuses sensor data from the sensors 1300, data from vehicle inertial measurement units (IMUs) and global positioning system (GPS) data. The ECU 1400 may be centralized in a single processing unit or distributed among multiple processing units.

The ECU 1400 as driven by the sensors 1300 constitutes the device under test (DUT) of the ADE platform 1000 of FIG. 8.

The example of FIG. 8 is built around scenario simulation linked to the HiL testbench 1500. A test sequencer (not shown) may control both the scenario simulator 1100 and the HiL testbench 1500 which operate in parallel.

The 3D scenario simulator 1100 is a software-implemented simulation device for creating a variety of vehicle drive scenarios that are selected and/or created by a user. Generally, the 3D scenario simulator 1100 will include or have access to a database (DB) 1101. The DB 1101 contains drive scenarios, sensing properties (e.g., radar scattering or lidar reflectivity properties) of various materials and objects found in the drive scenarios, dynamics of the vehicle and other objects (including the road) encountered in the drive scenarios, and other information relevant to the physical responses of the vehicle and objects in any given scenario. An example of the 3D scenario simulator 1100 is offered by IPG Automotive GMBH under the tradename Carmaker®. Among other things, the 3D scenario simulator 100 addresses testing for ADAS and autonomous vehicles. Tools and models may be provided to build virtual road environments, vehicle dynamics, traffic, sensors, real or virtual drivers, headlights, weather conditions and scenario scripting.

Inside the 3D scenario simulator 1100, several driving scenarios may be simulated and supplied to the sensor target emulator 1200. For all objects in the scenario, the material properties with respect to optical and radar reflectivity may also be provided. Based on this information, the sensor target emulator 1200 extracts information as to the manner in which the objects would be perceived by the camera sensor 1300a, the radar sensor 1300b and the lidar sensor 1300c. Based on the extracted information, hardware of the sensor target emulator 1200 is driven to emit sensing signals to the sensors 1300 which emulate the driving scenarios supplied from the 3D scenario simulator 1100.

For example, the sensor target emulator 1200 may include a parameter extractor 1200a, a camera target emulator driver 1201a and a monitor 1202a for generating a video image emulating a driving scenario of the 3D scenario simulator 1100. In operation, the parameter extractor 1200a may extract image pixel data (x, y, R, B and G) corresponding to the driving scenario of the 3D scenario simulator 1100. The extracted data may include shading and direct sunlight effects. This image pixel data (x, y, R, B and G) may be supplied to the camera target emulator driver 1201a which in turn drives the monitor 1202a to display an image (picture) corresponding to the image pixel data (x, y, R, B and G). The monitor 1202a may be arranged in front of the camera sensor 300a. In this way, the emulated image of the driving scenario displayed on the monitor 1202a is viewed by the image sensor 1300a and processed accordingly by the ECU 1400.

The sensor target emulator 1200 may further include a parameter extractor 1200b, a radar target emulator driver 1201*b* and a radar emitter 1202*b* for generating a radar signal ("chirp") emulating a radar reflection of the driving scenario of the 3D scenario simulator 1100. In operation, the parameter extractor 1200*b* may extract radar related data of the driving scenario from the 3D scenario simulator 100. This may include ray tracing in which the location (x, y) and distance (signal delay) of multiple objects of the driving scenario are represented. In addition, radar signatures of objects may be extracted, such as object velocity (Doppler) and object size/distance (attenuation). As will be understood, the radar cross section is a combination of object size and reflectivity. The reflectivity may be mapped to the attenuation being used for an individual pixel and the spatial dimension to an amount of pixels used to represent the object. This data may be supplied to the radar target emulator driver 1201*b* which in turn drives a radar emitter 1202*b* to emit a "reflected" radar signal corresponding to the driving scenario. The radar emitter 1202*b* may include the apparatus 100 described previously in connection with the embodiments of FIGS. 3 through 7, and may be arranged in front of the radar sensor 300*b*. In this way, the emulated radar reflection of the driving scenario emitted by the radar emitter a202*b* is sensed by the radar sensor a300*b* and processed accordingly by the ECU a400.

The sensor target emulator 1200 may further include a parameter extractor 1200*c*, a lidar target emulator driver 1201*c* and a lidar beam emitter 1202*b* for generating a lidar beam emulating a light reflection of the driving scenario of the 3D scenario simulator 1100. In operation, the parameter extractor 1200*c* may extract lidar related data of the driving scenario from the 3D scenario simulator 1100. Generally, this data will consist of the range of objects at locations (x, y) withing the driving scenario as represented by the delay of reflected light. This data may be supplied to the lidar target emulator driver 1201*b* which in turn drives the lidar beam source 1202*c* to emit a "reflected" light signal with a given delay corresponding to the driving scenario. The lidar beam emitter 202*c* may be arranged in front of the lidar sensor 1300*c*. In this way, the emulated light reflection of the driving scenario emitted by the lidar beam emitter 1202*c* is sensed by the lidar sensor 1300*c* and processed accordingly by the ECU 1400.

The inventive concepts also include a tangible, non-transitory computer readable medium is provided that stores instructions that cause a signal processor (e.g., the previously described 150) of a system for testing a vehicular radar to carry out a processor-implemented method of generating an emulated radar reflection signal of a target. A tangible, non-transitory computer readable medium is defined to be any medium that constitutes patentable subject matter under 35 U.S.C. § 101 and excludes any medium that does not constitute patentable subject matter under 35 U.S.C. § 101. Examples of such media include non-transitory media such as computer memory devices that store information in a format that is readable by a computer or data processing system. More specific examples of non-transitory media include computer disks and non-volatile memories. The processor-implemented method includes receiving a signal corresponding to a radar signal frame emitted by the vehicular radar, driving an emulation transmitter 112 to generate an emulated radar reflection signal of a target being emulated, and controlling the emulation transmitter 112 according to at least one characteristic of the target being emulated. The processor-implemented method further includes determining a current radar parameter among plural possible radar parameters of the radar signal frame of the vehicular radar, and adapting control signals which control the emulation transmitter according to the determined current radar parameter of the radar signal frame of the vehicular radar. The plural possible radar parameters include at least one of an instantaneous frequency and an instantaneous power.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

What is claimed is:

1. An apparatus for generating an emulated radar reflection signal of a target, comprising:
    a radar detector configured to detect a radar signal frame emitted by a device under test (DUT);
    an emulation transmitter configured to generate an emulated radar reflection signal of a target being emulated;
    a processor; and
    a memory that stores instructions, which when executed by the processor, causes the processor to: generate control signals, which control the emulation transmitter according to at least one characteristic of the target being emulated; to determine a current radar parameter among plural possible radar parameters of the radar signal frame of the DUT; and adapt the control signals, which control the emulation transmitter according to the determined current radar parameter of the radar signal frame of the DUT.

2. The apparatus of claim 1, wherein the plural possible radar parameters include at least one of an instantaneous frequency and an instantaneous power.

3. The apparatus of claim 1, wherein the current radar parameter is a chirp, and the control signals are adapted to adjust a threshold frequency according to the chirp.

4. The apparatus of claim 1, wherein the emulation transmitter comprises a plurality of miniature radar target simulators (M-RTSs).

5. The apparatus of claim 4, wherein the target includes a plurality of targets respectively corresponding to the plurality of M-RTSs.

6. The apparatus of claim 4, wherein each of the M-RTSs includes a frequency mixer having an input which receives the radar signal frame, and a variable gain amplifier having an input coupled to an output of the frequency mixer, and wherein the frequency mixer and variable gain amplifier are operatively responsive to the control signals generated by the processor.

7. The apparatus of claim 6, wherein the frequency mixer is an in-phase-quadrature (IQ) mixer.

8. The apparatus of claim 6, wherein each of the M-RTSs further includes an antenna and a circulator, and wherein the circulator includes a first port coupled to the antenna, a second port coupled to the input of the frequency mixer, and a third port coupled to an output of the variable gain amplifier.

9. The apparatus of claim 6, wherein each of the M-RTSs further includes a reception antenna coupled to an input of the frequency mixer, and a transmission antenna coupled to an output of the variable gain amplifier.

10. The apparatus of claim 4, wherein the radar detector includes an antenna that is separate from the plurality of M-RTSs.

11. The apparatus of claim 4, wherein radar detector detects the radar signal frame via an antenna of at least one of the plurality of M-RTSs.

12. The apparatus of claim 4, wherein adapting the control signals includes resetting each M-RTS to synchronize to the radar signal frame in response to detection of at least one of a detected instantaneous power and a detected instantaneous frequency of the radar signal frame.

13. The apparatus of claim 1, wherein the radar detector comprises:
  a mixer configured to down-convert to baseband a radar signal frame;
  a filter coupled to an output of the mixer; and
    an analog-to-digital converter having an input coupled to an output of the filter and an output coupled to the processor.

14. The apparatus of claim 1, wherein the radar detector comprises an RF diode power detector.

15. The apparatus of claim 1, wherein the processor is configured to adapt the control signals in response to detection of a change in a signal mode of the radar signal frame.

16. A system for testing a vehicular radar, comprising:
  a controller comprising a memory that stores instructions, and a processor that executes the instructions, wherein the instructions, when executed by the processor, cause the processor to execute a three-dimensional (3D) scenario simulation configured to generate drive scenarios including targets in a surrounding environment of the vehicular radar; and
  a target emulator configured to transmit an emulated radar reflection signal to the vehicular radar corresponding to the drive scenarios generated by the 3D scenario simulation,
  wherein the target emulator comprises a radar detector configured to detect a radar signal frame emitted by the vehicular radar, and an emulation transmitter configured to generate the emulated radar reflection signal of a target being emulated;
  wherein the instructions further cause the processor to:
generate control signals which control the emulation transmitter according to at least one characteristic of the target being emulated; determine a current radar parameter among plural possible radar parameters of the radar signal frame of the vehicular radar; adapt the control signals which control the emulation transmitter according to the determined current radar parameter of the radar signal frame of the vehicular radar.

17. The system of claim 16, wherein the plural possible radar parameters include at least one of an instantaneous frequency and an instantaneous power.

18. The system of claim 16, wherein the current radar parameter is a chirp, and the control signals are adapted to adjust a threshold frequency according to the chirp.

19. The system of claim 16, wherein the emulation transmitter comprises a plurality of miniature radar target simulators (M-RTSs), and the target includes a plurality of targets respectively corresponding to the plurality of M-RTSs, and
  wherein each of the M-RTSs includes a frequency mixer having an input which receives the radar signal frame, and a variable gain amplifier having an input coupled to an output of the frequency mixer, and wherein the frequency mixer and variable gain amplifier are operatively responsive to the control signal generated by the processor.

20. A tangible, non-transitory computer readable medium that stores instructions, which when executed by a signal processor of a system for testing a vehicular radar cause the processor to:
  receive a signal corresponding to a radar signal frame emitted by the vehicular radar;
  drive an emulation transmitter to generate an emulated radar reflection signal of a target being emulated;
  control the emulation transmitter according to at least one characteristic of the target being emulated;
determine a current radar parameter among plural possible radar parameters of the radar signal frame of the vehicular radar; and adapt control signals which control the emulation transmitter according to the determined current radar parameter of the radar signal frame of the vehicular radar, wherein the plural possible radar parameters include at least one of an instantaneous frequency and an instantaneous power.

* * * * *